US009137302B1

(12) United States Patent
Makhijani et al.

(10) Patent No.: US 9,137,302 B1
(45) Date of Patent: Sep. 15, 2015

(54) CONTENT DISTRIBUTION NETWORK SELECTOR

(75) Inventors: Michael A. Makhijani, Playa Vista, CA (US); Thai Lam, Torrance, CA (US); Vishal Arya, Los Angeles, CA (US); Sunil A. Jethwani, Encino, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 983 days.

(21) Appl. No.: 12/649,153

(22) Filed: Dec. 29, 2009

(51) Int. Cl.
  G06F 15/16 (2006.01)
  H04L 29/08 (2006.01)
  H04N 21/231 (2011.01)
  H04N 21/218 (2011.01)

(52) U.S. Cl.
  CPC ........ *H04L 67/1002* (2013.01); *H04N 21/2181* (2013.01); *H04N 21/23103* (2013.01)

(58) Field of Classification Search
  CPC ................. H04N 21/2181; H04N 21/23103; H04N 21/23116; H04L 67/1002
  USPC .......................................................... 709/235
  See application file for complete search history.

(56) References Cited

U.S. PATENT DOCUMENTS

| | | | | |
|---|---|---|---|---|
| 7,219,153 | B1 * | 5/2007 | Day ............................. | 709/229 |
| 7,260,598 | B1 * | 8/2007 | Liskov et al. ................. | 709/201 |
| 7,653,700 | B1 * | 1/2010 | Bahl et al. ..................... | 709/217 |
| 7,730,300 | B2 * | 6/2010 | Candelore ..................... | 713/155 |
| 7,970,820 | B1 * | 6/2011 | Sivasubramanian et al. . | 709/203 |
| 8,051,166 | B1 * | 11/2011 | Baumback et al. ........... | 709/224 |
| 8,065,417 | B1 * | 11/2011 | Richardson et al. .......... | 709/226 |
| 8,249,917 | B1 * | 8/2012 | Kassmann et al. ............. | 705/12 |
| 8,255,960 | B2 * | 8/2012 | Yu .................................... | 725/86 |
| 8,266,663 | B2 * | 9/2012 | McCarthy et al. ............. | 725/105 |
| 2001/0052016 | A1 * | 12/2001 | Skene et al. .................. | 709/226 |
| 2002/0078233 | A1 * | 6/2002 | Biliris et al. .................. | 709/238 |
| 2003/0079027 | A1 * | 4/2003 | Slocombe et al. ............ | 709/229 |
| 2003/0174648 | A1 * | 9/2003 | Wang et al. .................... | 370/235 |
| 2004/0019659 | A1 * | 1/2004 | Sadot et al. ................... | 709/219 |
| 2004/0117438 | A1 * | 6/2004 | Considine et al. ............ | 709/203 |
| 2004/0194102 | A1 * | 9/2004 | Neerdaels ...................... | 718/100 |
| 2007/0217436 | A1 * | 9/2007 | Markley et al. ............... | 370/401 |
| 2007/0233706 | A1 * | 10/2007 | Farber et al. .................... | 707/10 |
| 2007/0265970 | A1 * | 11/2007 | Kahn et al. ....................... | 705/52 |
| 2008/0232361 | A1 * | 9/2008 | Kimiyama et al. ............ | 370/389 |
| 2008/0301262 | A1 * | 12/2008 | Kinoshita et al. ............. | 709/219 |
| 2009/0037361 | A1 * | 2/2009 | Prathaban et al. ............. | 706/47 |
| 2009/0182815 | A1 * | 7/2009 | Czechowski et al. ......... | 709/206 |
| 2009/0199230 | A1 * | 8/2009 | Kumar et al. ................... | 725/32 |
| 2009/0228607 | A1 * | 9/2009 | Soo et al. ....................... | 709/249 |
| 2009/0259611 | A1 * | 10/2009 | Wang et al. ...................... | 706/47 |
| 2009/0293096 | A1 * | 11/2009 | Nahm et al. .................... | 725/131 |
| 2010/0023395 | A1 * | 1/2010 | Bugenhagen .............. | 705/14.45 |
| 2010/0036954 | A1 * | 2/2010 | Sakata et al. .................. | 709/226 |
| 2010/0064324 | A1 * | 3/2010 | Jenkin et al. ..................... | 725/59 |
| 2010/0205286 | A1 * | 8/2010 | Rechterman ................. | 709/223 |
| 2011/0055420 | A1 * | 3/2011 | Zuckerman et al. .......... | 709/231 |
| 2011/0219109 | A1 * | 9/2011 | Zehavi et al. ................. | 709/223 |
| 2012/0023530 | A1 * | 1/2012 | Xia ................................. | 725/93 |

* cited by examiner

Primary Examiner — Imad Hussain

(57) ABSTRACT

Systems and methods for content delivery are disclosed. A content delivery system in accordance with one or more embodiments of the present invention comprises a plurality of content delivery networks, and at least one network selector, wherein the at least one network selector analyzes a content delivery request, determines which content delivery networks in the plurality of content delivery networks are suitable for fulfilling the content delivery request, and selects one of the suitable content delivery networks to fulfill the content delivery request.

21 Claims, 8 Drawing Sheets

CONTENT DISTRIBUTION NETWORK SELECTOR

BACKGROUND OF THE INVENTION

1. Field of the Invention

The present invention relates generally to satellite video systems, and in particular, to a method and apparatus for content distribution network selection.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location and additional orbital locations without departing from the scope of the present invention.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Alternatively, uplink facilities 118 can send signals via cable 122 either in conjunction with uplink signals 116 or instead of uplink signals 116 to IRD 112, for display on monitor 114. Cable 122 can be a standard television cable, an internet connection, a broadband connection, or any combination of one or more data connections to IRD 112.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz, but typically 20-30 GHz.

As satellites 102-106 broadcast additional services and additional channels to the home, users will like and expect these additional services to be delivered at reasonable cost. Viewers and users of services, e.g., wireless networking, internet services, etc., will like and expect to have access to these services and integrate these services with other services, e.g., wireless telephone communications, etc.

FIG. 2 illustrates a typical IRD of the related art.

IRD 112 typically has an input from downlink 120, and processes the input from downlink 120 as necessary to produce a visible and audible image on monitor 114. Further, other signals can be input to IRD 112, such as cable 122, and broadband internet connection 200, which allow additional inputs and outputs to IRD 112. In many cases, IRD 112 can contain or can otherwise be connected to a Digital Video Recorder (DVR) 202, such that information from any of the inputs 120, 122, Or 200 can be recorded on DVR 202.

Remote control 204 is also typically used to control features and operation of IRD 112. For example, remote control 204 can change which viewer channel is being displayed on monitor 114, which essentially commands IRD 112 which downlink 120 signal, cable 122 signal, or broadband internet connection 200 signal, or whether a playback of previously recorded information on DVR 202, is desired by the viewer to be seen on monitor 114.

Remote control 204 can also be used to control additional access to IRD 112. For example, when IRD 112 is coupled to the service provider authorization center via broadband internet connection 200 (or a standard telephone line, or via cable 122, or via other backchannel connections as needed), then a viewer can order a pay-per-view movie, additional channels, or other services that require the service provider to send commands to IRD 112 authorizing access to that content. Some of this content may be delivered via satellites 102-106, and portions of the content may also be delivered via broadband internet connection 200 or cable 122. Further, content may be delivered without viewer request, which is known as a "push" of data to an IRD 112. Data delivered to IRD 112 in any or all of these scenarios may also be recorded on DVR 202. Internet connection 200 is also used for programming IRD 112 and/or DVR 202 from other locations, such as via the internet or from a cellular telephone.

However, delivery of data, even with satellite 102-106 bandwidths and broadband 200 bandwidths, takes time. Further, the varied types and selections of content, e.g., current movies, older movies, current and past episodes of television shows, etc., provides more data than can be delivered at any given time.

It can be seen, then, that there is a need in the art for a satellite broadcast system that can be expanded. It can also be seen that there is a need in the art for a satellite/broadband broadcast system that can deliver additional information to each subscriber as needed or requested.

SUMMARY OF THE INVENTION

To minimize the limitations in the prior art, and to minimize other limitations that will become apparent upon reading and understanding the present specification, the present invention comprises systems and methods for efficiently delivering content via multiple content delivery networks.

A content delivery system in accordance with one or more embodiments of the present invention comprises a plurality of content delivery networks, and at least one network selector, wherein the at least one network selector analyzes a content delivery request, determines which content delivery networks in the plurality of content delivery networks are suitable for fulfilling the content delivery request, and selects one of the suitable content delivery networks to fulfill the content delivery request.

Such a system further optionally comprises the at least one network selector selects the suitable content delivery network to fulfill the content delivery request based on one or more of: an interne protocol (IP) address of a user that made the content delivery request, a geographical relationship between the selected suitable content delivery network and the IP address, an authentication card identifier of a user that made the content delivery request, a load balancing of a communications network between a user that made the content delivery request and the selected suitable content delivery network, a round robin selection of a communications network between a user that made the content delivery request and the selected suitable content delivery network, and a peer relationship between a communications network and a user that made the content delivery request and the selected suitable content delivery network.

The system also optionally comprises a plurality of network selectors, and further comprises at least one load balancer, coupled to the plurality of network selectors, wherein the at least one load balancer selects one of the network selectors in the plurality of network selectors as suitable for fulfilling the content delivery request, wherein the at least one load balancer comprises a plurality of load balancers, and at least one of the plurality of load balancers is coupled in series with another of the plurality of load balancers.

A method in accordance with one or more embodiments of the present invention comprises receiving a content delivery request, analyzing the content delivery request, determining which content delivery networks in the plurality of content delivery networks are suitable for fulfilling the content delivery request, selecting, using at least one network selector, one of the suitable content delivery networks, and fulfilling the content delivery request with the selected one of the suitable content delivery networks.

Such a method further optionally comprises selecting one of the suitable content delivery network to fulfill the content delivery request comprising one or more of: analyzing an internet protocol (IP) address of a user that made the content delivery request, analyzing a geographical relationship between the selected suitable content delivery network and the IP address, analyzing an authentication card identifier of a user that made the content delivery request, analyzing a load balancing of a communications network between a user that made the content delivery request and the selected suitable content delivery network, using a round robin selection of a communications network between a user that made the content delivery request and the selected suitable content delivery network, using a peer relationship between a communications network and a user that made the content delivery request and the selected suitable content delivery network, balancing usage between a plurality of network selectors, balancing usage between a plurality of network selectors comprises balancing usage in a regional area, and wherein balancing usage between a plurality of network selectors further comprises balancing usage in a global area.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention enables a satellite broadcast system (e.g., DIRECTV) consumer's home to be more efficiently served when the satellite receiver (also referred to as the IRD) is also coupled to a broadband internet connection.

The present invention enables the delivery of digital video, audio and other content to consumer homes in a highly cost effective and efficient manner through the efficient use of content delivery network (CDN) services and assets. The distribution of such content to additional users as they need the content can be made using the consumers' broadband or other connections in such a manner that the neither the broadband connection nor television viewing experience are impacted, and minimal data transmission costs are incurred by the operator.

The present invention works with consumer satellite set top boxes (e.g., IRDs 112, and/or IRDs 112 with DVR capabilities) that are connected to a broadband internet connection 200, regardless of what type of connection it is (DSL, fiber, satellite, etc.).

Figure 1:
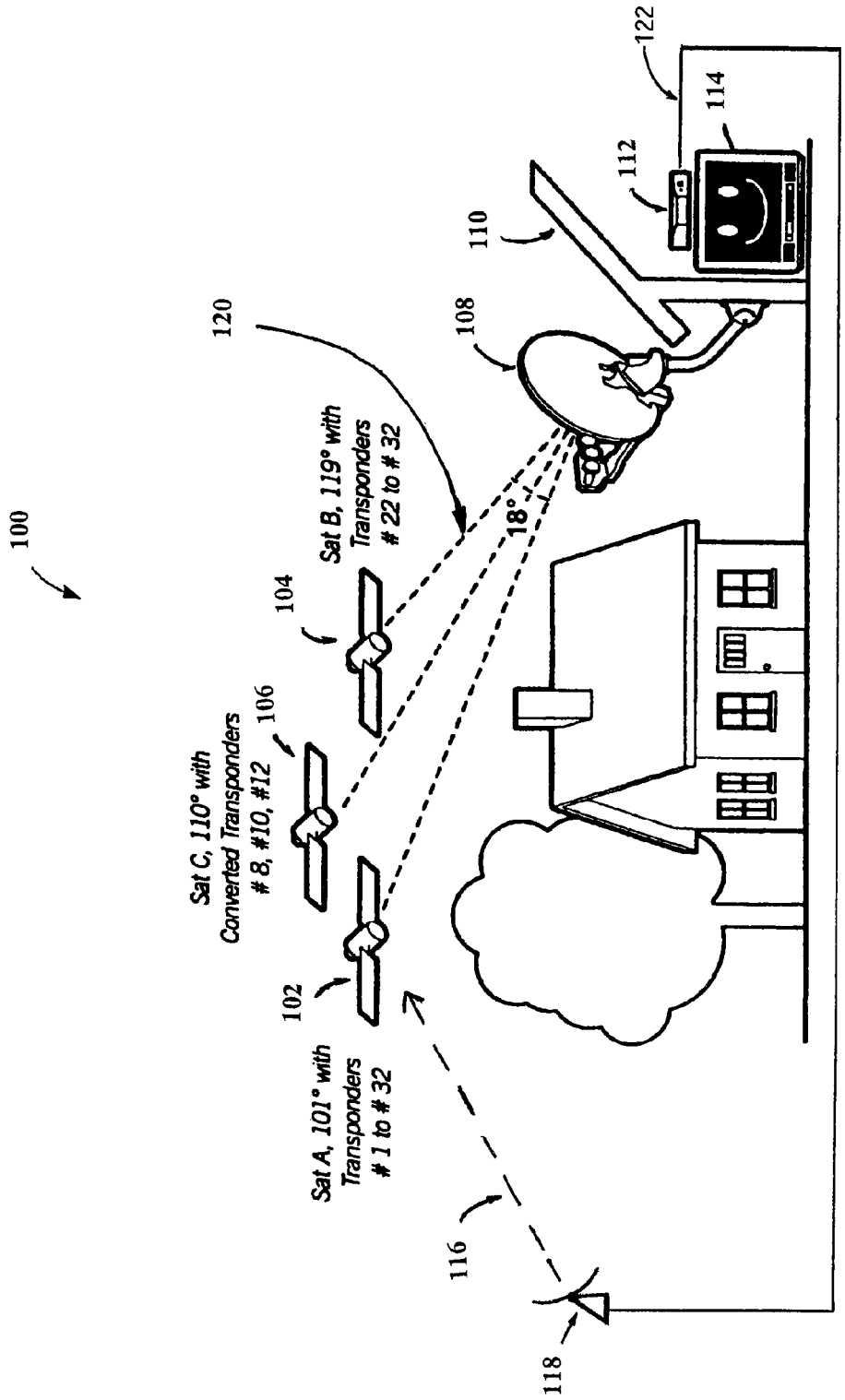
FIG. 1 illustrates a typical satellite television installation of the related art.
Figure 2:
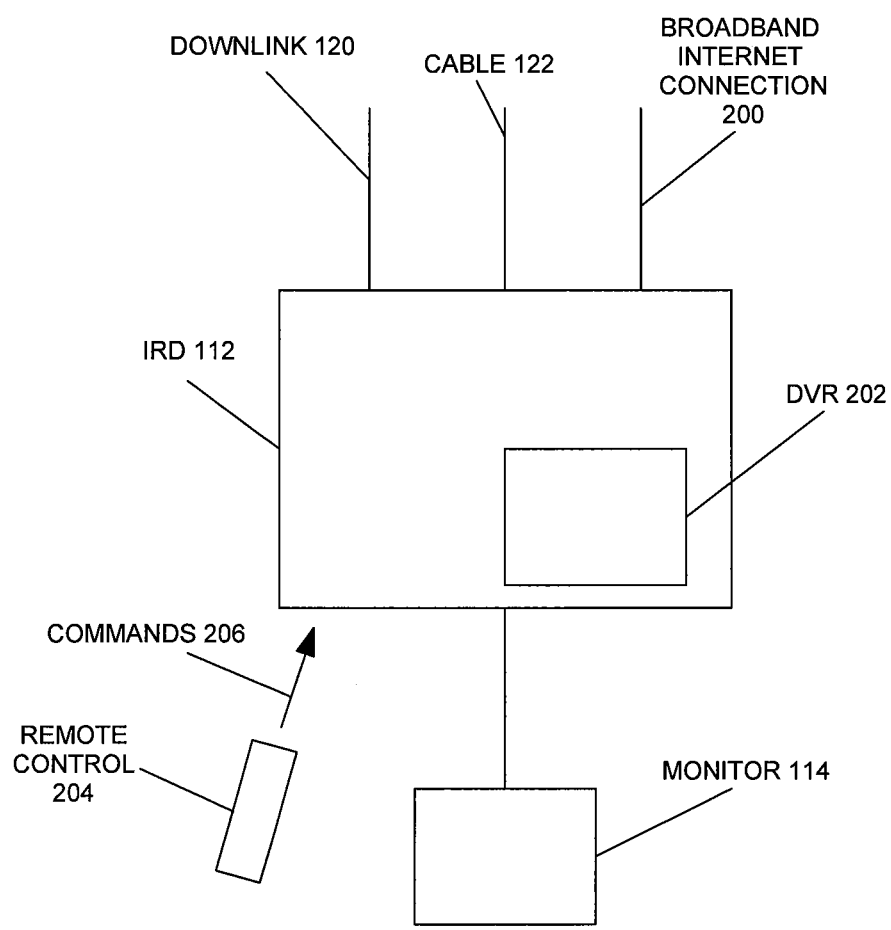
FIG. 2 illustrates a typical IRD of the related art.
Figure 3:
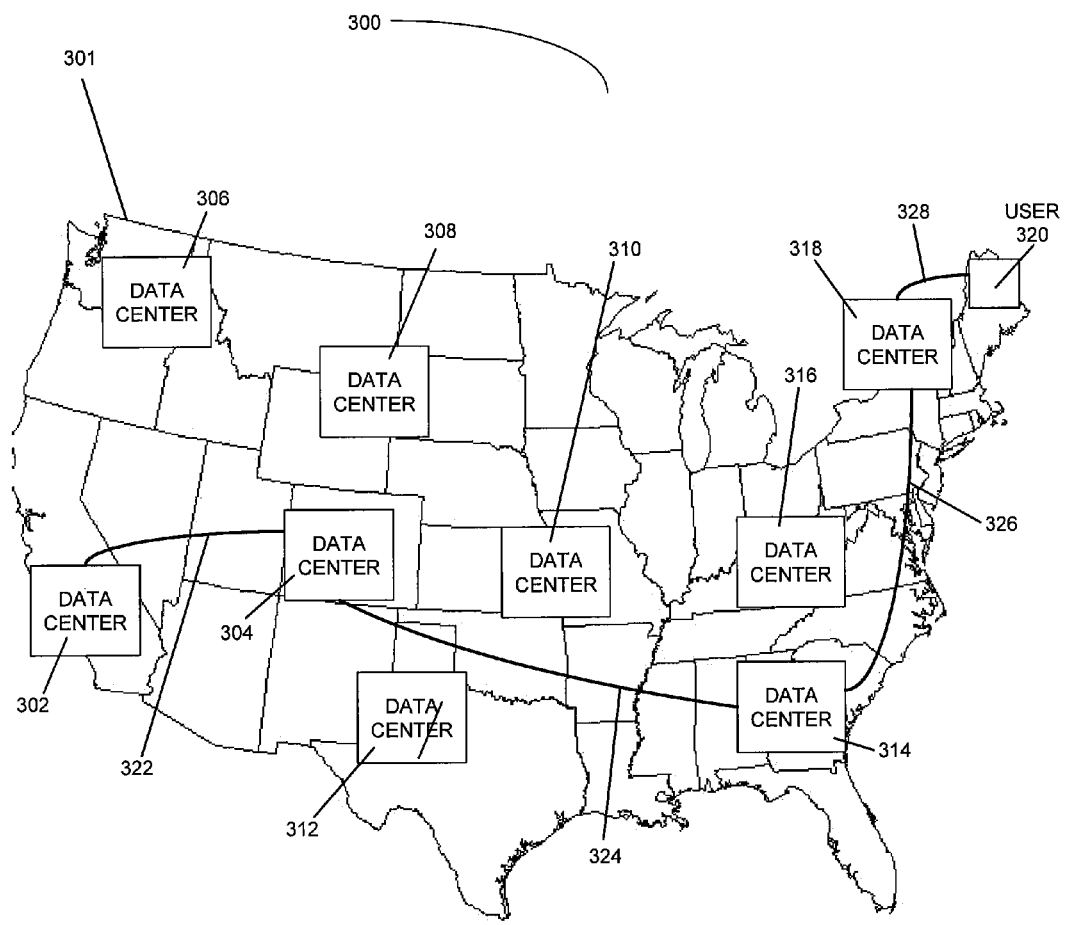
FIG. 3 illustrates a system in accordance with the related art.

FIG. 3 illustrates a system in accordance with the related art.

Content Delivery Network (CDN) 300 is typically a system of computers networked together within a geographic area 301 across a communications link, usually the internet, that cooperate transparently to deliver content to end users within the system.

Within CDN 300, several data centers 302-308 are present, and each data center 302-308 acts as a repository or storage location for data content. Whenever content is requested by a user within CDN 300, CDN 300 determines where the content is stored and how to deliver that content most efficiently to the requesting user.

So, for example, and not by way of limitation, a user 320 within CDN 300 in Maine may want to view content that is stored at data center 302. To deliver the content from data center 302, the content is usually delivered in "hops," i.e., by delivering the content from one data center 302-318 to another data center 302-318, using a high-speed delivery network, such that the delivery from the storage location to the end user 320 from a distant data center 302-318 is not limited by the connection to the user 320. In this case, hop 1 322 delivers the content from data center 302 to data center 304, hop 2 324 delivers the content from data center 304 to data center 314, and hop 3 326 delivers the content from data center 314 to data center 318, where the content is now present in the data center 318 geographically closest to user 320. Content is then delivered to user 320 via system connection 328, which typically has a different and smaller throughput capability than the hops 322-226.

The difficulties and limitations of such a CDN 300 are apparent in that content generated by a local data center, e.g., data center 302, now require CDN 300 backbone usage to transmit that content to the remainder of the data centers 304-318. As such, either the CDN 300 utilizes resources to send this content in parallel, which utilizes large portions of the bandwidth of each "hop" connection to other data centers 304-318, or this content is sent in series, which now utilizes additional time of transmission (also known as latency) for the content to reach other data centers 304-318. A parallel distribution on the Internet backbone for such content requires large data throughput rates that are unsupportable by standard internet connections. A serial distribution adds latency to the content in that it may take several minutes to deliver the content from one data center to another, and each hop 322-326 adds additional latency. Either way, CDN 300 efficiencies and usage are burdened.

CDN Selector

Typically, a single CDN 300 is used for content storage and distribution. However, as system requirements and additional content access are added, multiple CDNs 300 can be utilized to provide less latency and more competitive pricing structures.

Figure 4:
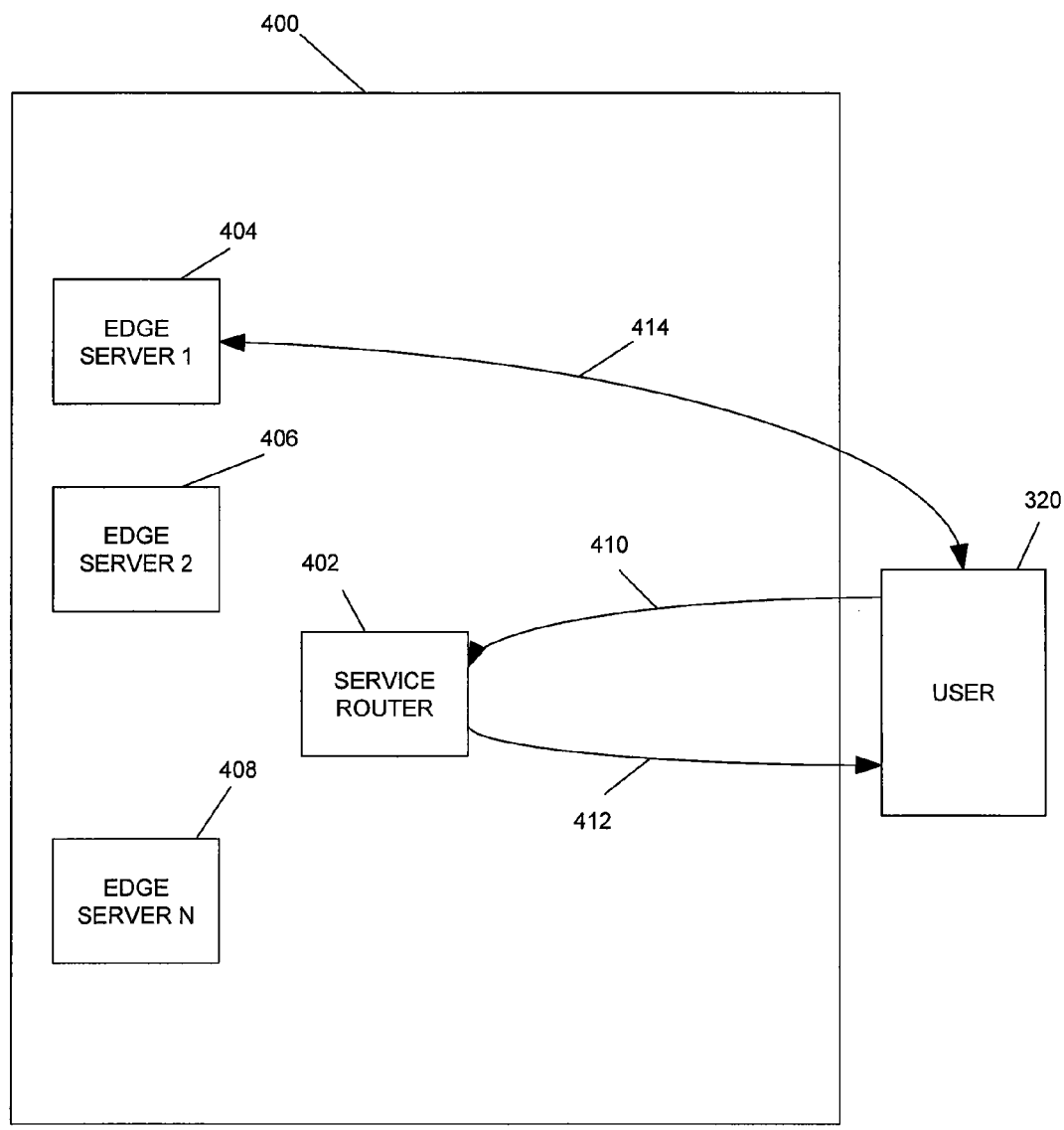
FIG. 4 illustrates a CDN in accordance with one or more embodiments of the present invention.

FIG. 4 illustrates a CDN in accordance with one or more embodiments of the present invention.

A CDN 400 in accordance with one or more embodiments of the present invention comprises a service router 402 and one or more edge servers 404-408. Broadband content is injected and distributed to edge servers 404-408 where the actual content is streamed to users 320, e.g., computers, IRDs 112, etc. Service router 402 directs user 320 requests to an edge server 404-408 based on various criteria such as edge server 404-408 functional state, load distribution percentage, and location proximity.

The typical flow of data delivery is that user 320, via a client application, contacts service router 402 for specific content delivery as shown in request 410. Based on the selection criteria, service router 402 authenticates the request, and then either redirects the client request to an edge server, e.g., edge server 404, or returns the address of an edge server 404-408 to user 320, as shown in reply 412. The user 320 client application then streams or downloads the specific content from the assigned edge server 404 as illustrated in link 414. Optionally, the user 320 IP can be added to request 410; if such an IP is present in request 410, the CDN 400 will use the user 320 IP.

Figure 5:
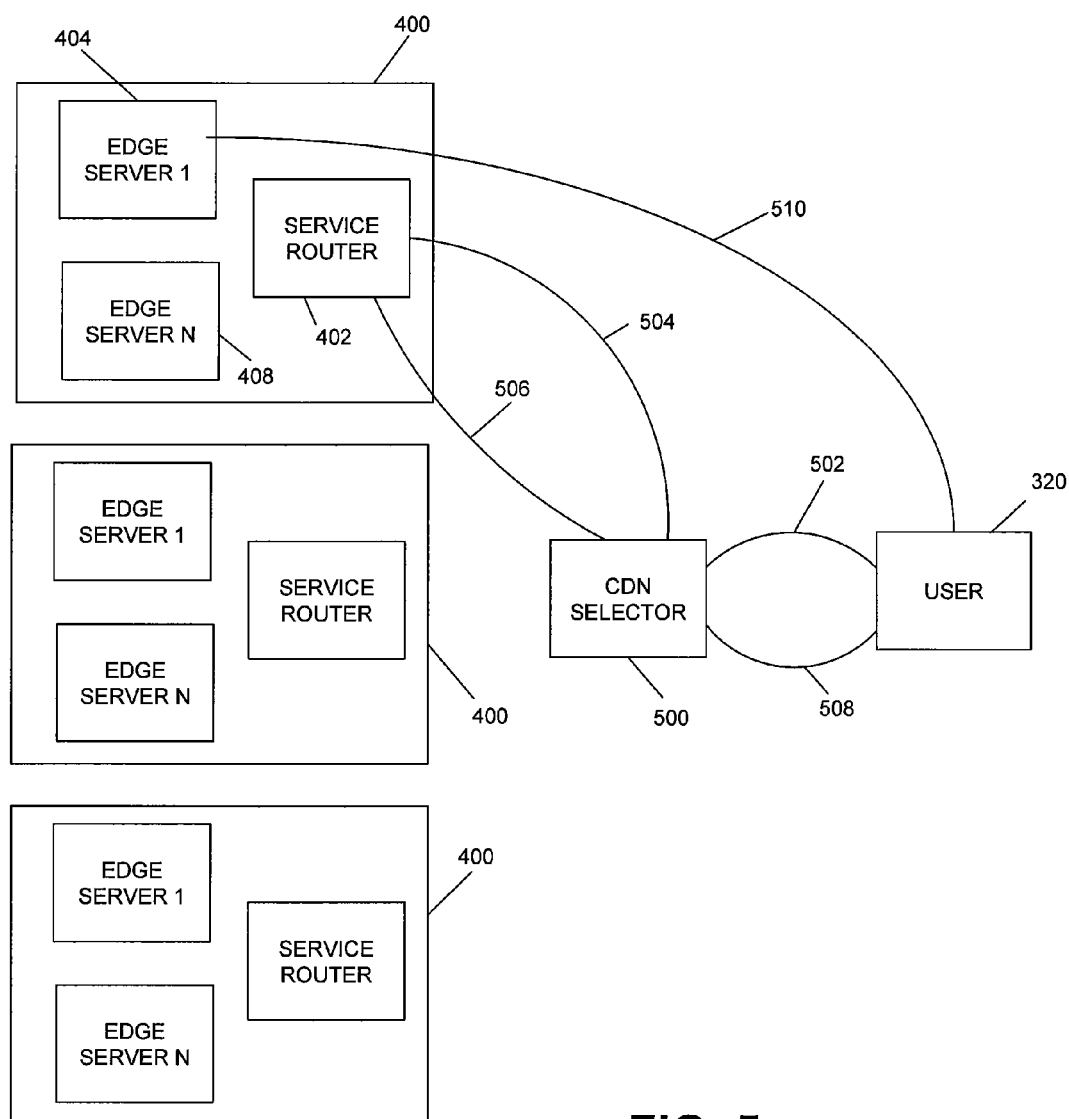
FIG. 5 illustrates a CDN selector in accordance with one or more embodiments of the present invention.

FIG. 5 illustrates a CDN selector in accordance with one or more embodiments of the present invention.

The CDN selector 500 of the present invention acts as a transparent interface to both user 320 and to the multiple CDNs 400 now accessible to user 320. Typically, user 320 is tied to a specific CDN 400, and cannot access multiple CDNs 400. CDN selector 500 not only provides access to multiple CDNs 400, CDN selector 500 provides additional efficiency to user 320 in terms of content delivery.

Initially, user 320 requests content via request 502 from CDN selector 500. Request 502 typically comprises a content identifier, a user 320 ID, e.g., an IRD 112 identifier or user 320 account identifier, and an authentication mark or "hash" such that CDN selector 500 can verify that user 320 is authorized to use the system shown in FIG. 5 and such that CDN selector 500 can determine the proper CDN 400 to deliver the requested content. Authentication of the user 320 can occur at any time during the content delivery.

CDN selector 500 then determines which CDN 400 is best suited to fulfill user 320's request. CDN selector 500 can use one or more criteria to select the CDN 400 best suited to fulfill the request, as described hereinbelow. Once CDN selector 500 determines which CDN 400 is best suited, CDN selector 500 forwards the user 320 request to the selected CDN 400's service router 402 via request 504. To service router 402, request 504 is equivalent to any other request 504 that came directly from a user 320.

As described with respect to FIG. 4, service router 402 then determines which of the edge servers 404-408 in that particular CDN 400 that is best suited to fulfill the request 504 in the manner used by that particular CDN 400, and forwards the selected edge server's address, e.g., edge server 1 404's address, to CDN selector 500 via response 506.

CDN selector 500 then forwards the address of edge server 404 to user 320 via response 508, and then user 320 requests the content directly from edge server 404 via link 510, which is established and then used to download the content to user 320.

CDN Selector Selection Criteria

CDN selector 500 can use one or several criteria to determine which CDN 400 would best respond or even be suitable to respond to a given user 320's request 502. For example, and not by way of limitation, CDN selector 500 can review the user 320's IP address, and, based on locality of that user 320's IP address, select a CDN that is geographically proximate to that user 320. However, if the request from that user 320 is asking for a specific content ID that may be better delivered by a more geographically distant CDN 400, because, e.g., the more geographically distant CDN 400 has a higher throughput speed than the geographically proximate CDN 400, CDN selector 500 might select the more geographically distant CDN 400.

A user 320's IRD 112 may have an authentication card ID that identifies that IRD 112 as a "low speed" IRD (no broadband connection), and thus, CDN selector 500 may use this data to further determine or solely determine which CDN 400 to use to fulfill the user 320's request 502.

Other selection criteria may also be used to assist CDN selector 500 in determining which CDN 400 to use for a given request 502. For example, and not by way of limitation, CDN selector 500 may randomly select a CDN 400 and then use a round-robin algorithm to send selections to other CDNs 400 to "load balance" the communications network between the users 320 and the CDNs 400. Further, CDN selector 500 may use a load distribution percentage calculation, or verify the load that each individual CDN 400 is currently delivering, to select a CDN 400 for a given request. Other criteria, such as the user 320's hosting ISP, the CDN 400's hosting ISP, the peer relationship between the CDN selector 500 and/or user 320 and various ISPs used to complete content delivery on link 510, may also be taken into consideration by CDN selector 500 to determine which CDN 400 to use for a given request 502.

Further, the CDN selector 500 may determine that more than one CDN 400 is suitable to fulfill request 502. In such a case, CDN selector 500 may randomly select one of the suitable CDNs 400, or use multiple criteria as described herein, or other criteria, to further determine which of the suitable CDNs 400 may better fulfill the request 502.

Figure 6:
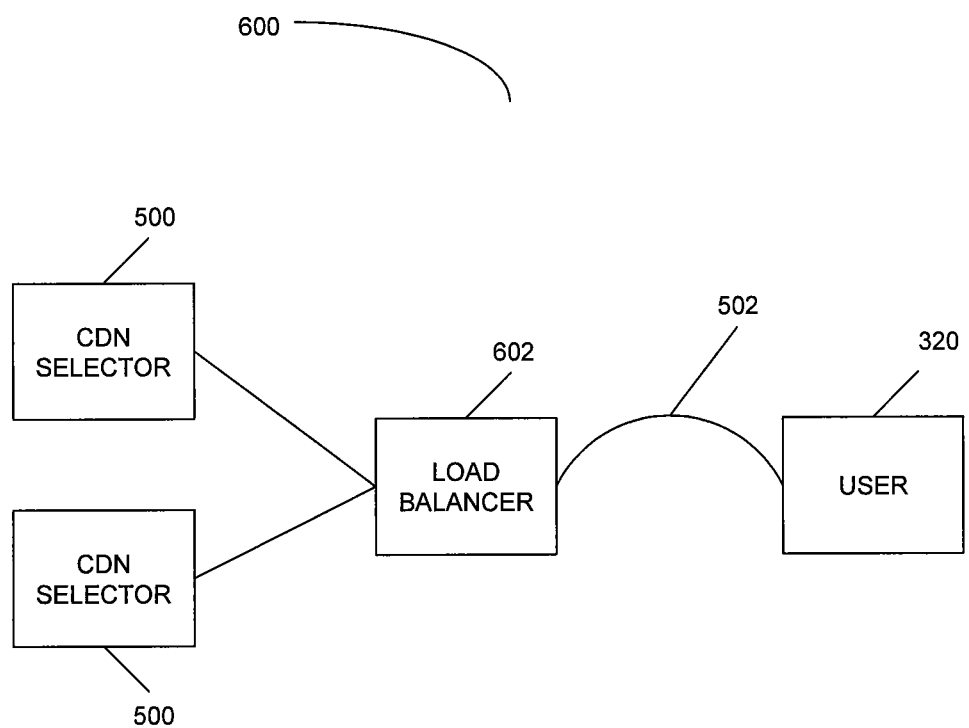
FIGS. 6 and 7 illustrate systems in accordance with one or more embodiments of the present invention.
Figure 7:
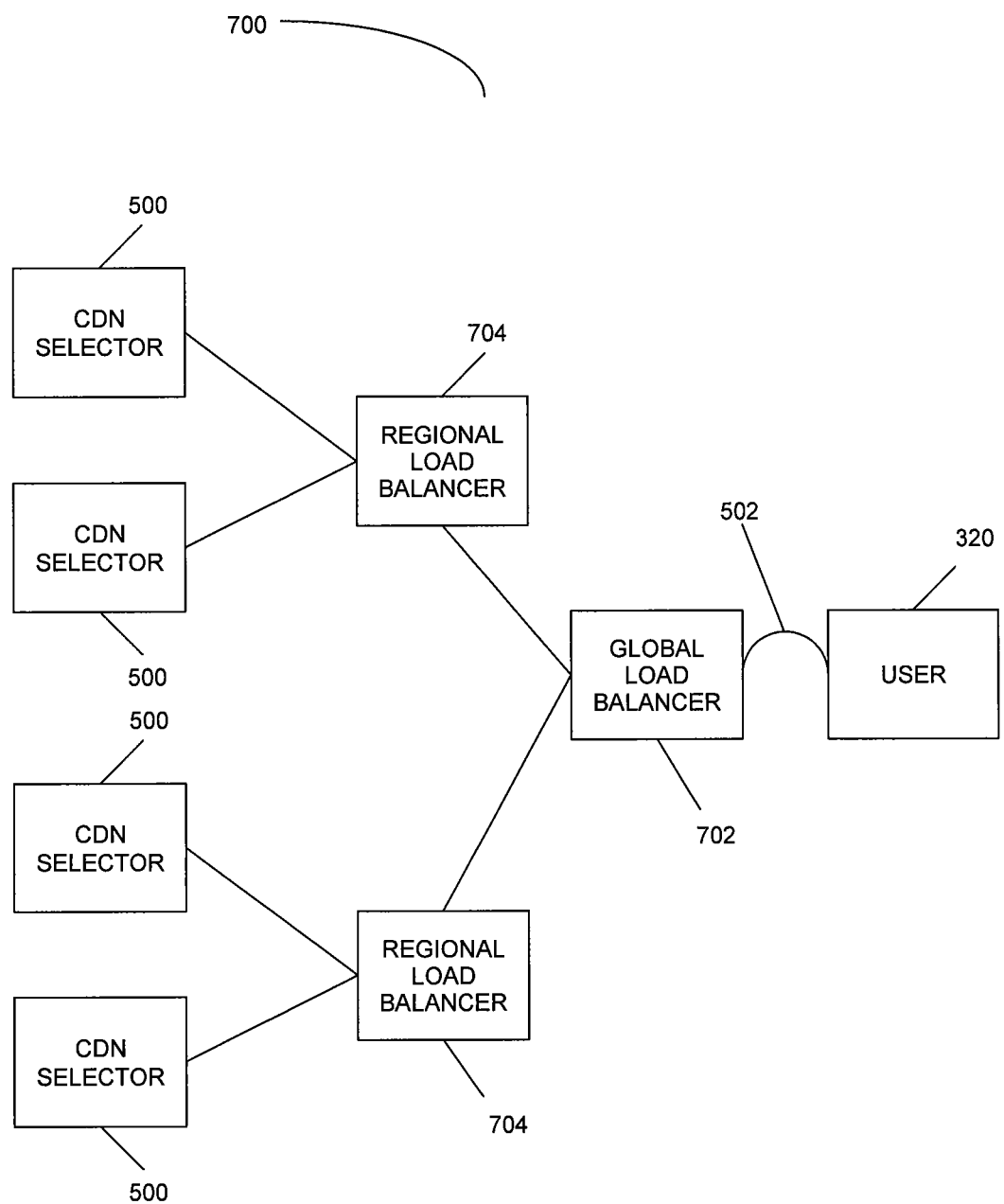

FIGS. 6 and 7 illustrate systems in accordance with one or more embodiments of the present invention.

System 600 illustrates multiple CDN selectors 500, with a load balancer 602 placed between the user 320 and the CDN selectors 500. Thus, for each request 502, load balancer 602 can determine which CDN selector 500 is best able to fulfill that given request 502.

FIG. 7 illustrates a system 700 with a global load balancer 702 and one or more regional load balancers 704. Each load balancer 602, 702, 704 performs load distribution logic such as round robin, percentage load sharing, or other distribution criteria, for the requests 502 that are sent within system 700 to more efficiently fulfill requests 502 within systems 600 or 700 from the various CDN selectors 500.

Process Chart

Figure 8:
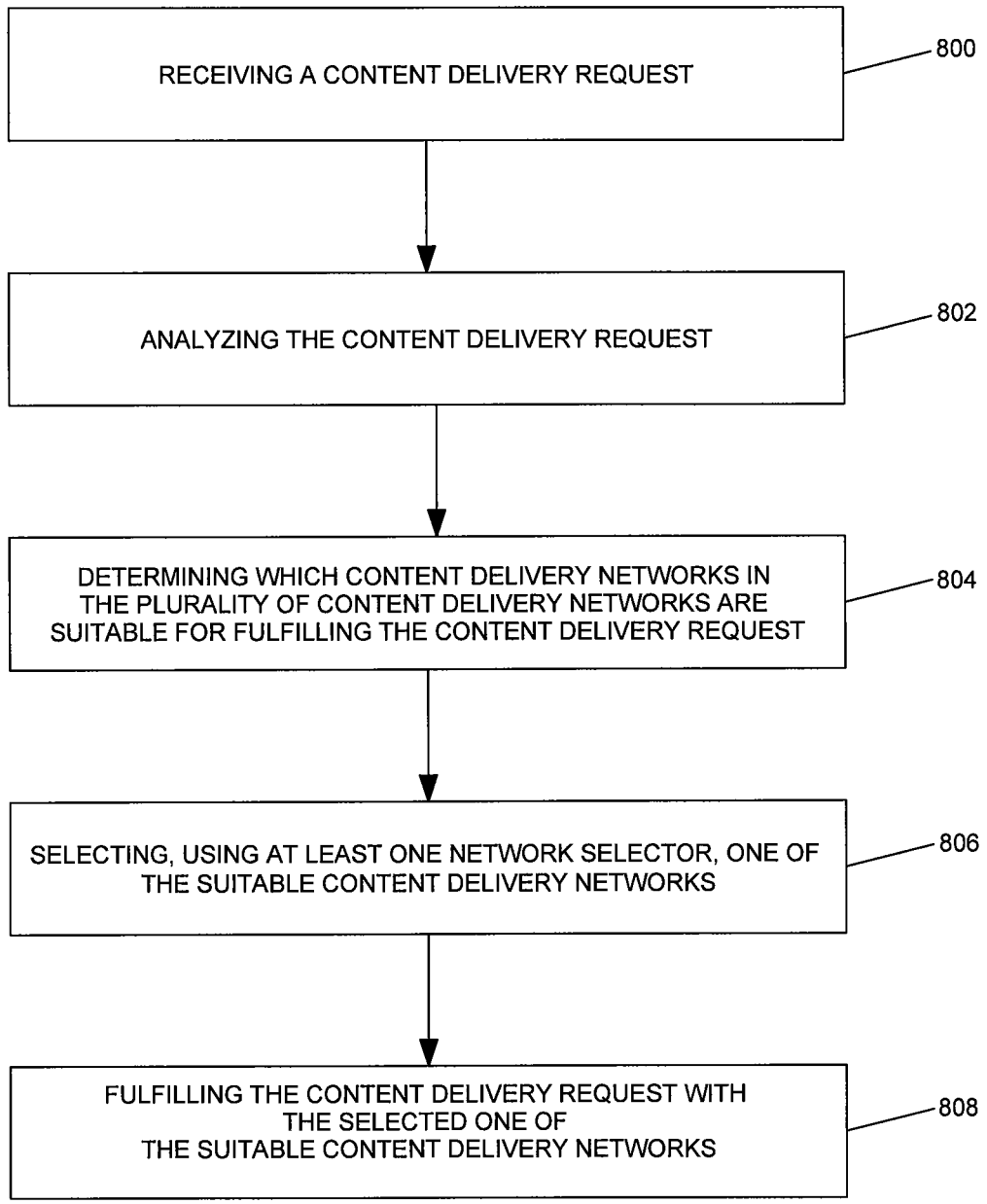
FIG. 8 illustrates a process chart in accordance with one or more embodiments of the present invention.

FIG. 8 illustrates a process chart in accordance with one or more embodiments of the present invention.

Box 800 illustrates receiving a content delivery request.

Box 802 illustrates analyzing the content delivery request.

Box 804 illustrates determining which content delivery networks in the plurality of content delivery networks are suitable for fulfilling the content delivery request.

Box 806 illustrates selecting, using at least one network selector, one of the suitable content delivery networks.

Box 808 illustrates fulfilling the content delivery request with the selected one of the suitable content delivery networks.

CONCLUSION

The present invention comprises systems and methods for delivering content in a content delivery system.

A content delivery system in accordance with one or more embodiments of the present invention comprises a plurality of content delivery networks, and at least one network selector, wherein the at least one network selector analyzes a content delivery request, determines which content delivery networks in the plurality of content delivery networks are suitable for fulfilling the content delivery request, and selects one of the suitable content delivery networks to fulfill the content delivery request.

Such a system further optionally comprises the at least one network selector selects the suitable content delivery network to fulfill the content delivery request based on one or more of: an internet protocol (IP) address of a user that made the content delivery request, a geographical relationship between the selected suitable content delivery network and the IP address, an authentication card identifier of a user that made the content delivery request, a load balancing of a communications network between a user that made the content delivery request and the selected suitable content delivery network, a round robin selection of a communications network between a user that made the content delivery request and the selected suitable content delivery network, and a peer relationship between a communications network and a user that made the content delivery request and the selected suitable content delivery network.

The system also optionally comprises a plurality of network selectors, and further comprises at least one load balancer, coupled to the plurality of network selectors, wherein the at least one load balancer selects one of the network selectors in the plurality of network selectors as suitable for fulfilling the content delivery request, wherein the at least one load balancer comprises a plurality of load balancers, and at least one of the plurality of load balancers is coupled in series with another of the plurality of load balancers.

A method in accordance with one or more embodiments of the present invention comprises receiving a content delivery request, analyzing the content delivery request, determining which content delivery networks in the plurality of content delivery networks are suitable for fulfilling the content delivery request, selecting, using at least one network selector, one of the suitable content delivery networks, and fulfilling the content delivery request with the selected one of the suitable content delivery networks.

Such a method further optionally comprises selecting one of the suitable content delivery network to fulfill the content delivery request comprising one or more of: analyzing an internet protocol (IP) address of a user that made the content delivery request, analyzing a geographical relationship between the selected suitable content delivery network and the IP address, analyzing an authentication card identifier of a user that made the content delivery request, analyzing a load balancing of a communications network between a user that made the content delivery request and the selected suitable content delivery network, using a round robin selection of a communications network between a user that made the content delivery request and the selected suitable content delivery network, using a peer relationship between a communications network and a user that made the content delivery request and the selected suitable content delivery network, balancing usage between a plurality of network selectors, balancing usage between a plurality of network selectors comprises balancing usage in a regional area, and wherein balancing usage between a plurality of network selectors further comprises balancing usage in a global area.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A content delivery system, comprising:
    a plurality of content delivery networks, wherein each content delivery network comprises a service router and a plurality of content servers; and
    at least one network selector executed by a computer, wherein:
    the at least one network selector analyzes a content delivery request received from a set top box, wherein the content delivery request comprises a content identifier for data content being requested and a set top box identifier identifying the set top box;
    the at least one network selector determines which content delivery networks in the plurality of content delivery networks are suitable for fulfilling the content delivery request;
    the at least one network selector selects one of the suitable content delivery networks to fulfill the content delivery request to the set top box, wherein the selecting is based on the content identifier and the set top box identifier;
    the at least one network selector forwards the content delivery request to the service router in the selected suitable content delivery network, wherein the network selector acts as a transparent interface to both the set top box and the plurality of content delivery networks;
    based on the content delivery request, the service router in the selected suitable content delivery network selects one of the plurality of content servers to fulfill the content delivery request; and
    the set top box communicates directly with the selected content server to fulfill the content delivery request.

2. The content delivery system of claim 1, wherein the at least one network selector selects the suitable content delivery network to fulfill the content delivery request based on an internet protocol (IP) address of a user that made the content delivery request.

3. The content delivery system of claim 2, wherein the at least one network selector selects the suitable content delivery network to fulfill the content delivery request based on a geographical relationship between the selected suitable content delivery network and the IP address.

4. The content delivery system of claim 1, wherein the set top box identifier comprises an authentication card identifier of the set top box that made the content delivery request.

5. The content delivery system of claim 1, wherein the at least one network selector selects the suitable content delivery network to fulfill the content delivery request based on a load balancing of a communications network between a user that made the content delivery request and the selected suitable content delivery network.

6. The content delivery system of claim 1, wherein the at least one network selector selects the suitable content delivery network to fulfill the content delivery request based on a round robin selection of a communications network between a user that made the content delivery request and the selected suitable content delivery network.

7. The content delivery system of claim 1, wherein the at least one network selector selects the suitable content delivery network to fulfill the content delivery request based on a peer relationship between a communications network and a user that made the content delivery request and the selected suitable content delivery network.

8. The content delivery system of claim 1, wherein the at least one network selector comprises a plurality of network selectors, and further comprising at least one load balancer, coupled to the plurality of network selectors, wherein the at least one load balancer selects one of the network selectors in the plurality of network selectors as suitable for fulfilling the content delivery request.

9. The content delivery system of claim 8, wherein the at least one load balancer comprises a plurality of load balancers, and at least one of the plurality of load balancers is coupled in series with another of the plurality of load balancers.

10. The content delivery system of claim 1 wherein:
the content delivery request further comprises authentication information that is used by the network selector to verify that the set top box is authorized to receive the requested data content; and
the selecting is further based on the authentication information.

11. A method for delivering data from a plurality of content delivery networks, comprising:
receiving, in a network selector, a content delivery request from a set top box, wherein the content delivery request comprises a content identifier for data content being requested and a set top box identifier identifying the set top box;
analyzing, in the network selector, the content delivery request;
determining, in the network selector, which content delivery networks in the plurality of content delivery networks are suitable for fulfilling the content delivery request;
selecting, using the network selector, one of the suitable content delivery networks, wherein the selecting is based on the content identifier and the set top box identifier;
forwarding, using the network selector, the content delivery request to a service router in the selected suitable content delivery network, wherein the service router selects one of a plurality of content servers in the selected suitable content delivery network to fulfill the content delivery request, wherein the network selector acts as a transparent interface to both the set top box and the plurality of content delivery networks; and
fulfilling the content delivery request to the set top box with the selected one of the suitable content delivery networks, wherein the set top box communicates directly with the selected content server to fulfill the content delivery request.

12. The method of claim 11, wherein selecting one of the suitable content delivery network to fulfill the content delivery request comprises analyzing an internet protocol (IP) address of a user that made the content delivery request.

13. The method of claim 12, wherein selecting the suitable content delivery network to fulfill the content delivery request comprises analyzing a geographical relationship between the selected suitable content delivery network and the IP address.

14. The method of claim 11, wherein the set top box identifier comprises an authentication card identifier of the set top box that made the content delivery request.

15. The method of claim 11, wherein selecting the suitable content delivery network to fulfill the content delivery request comprises analyzing a load balancing of a communications network between a user that made the content delivery request and the selected suitable content delivery network.

16. The method of claim 11, wherein selecting the suitable content delivery network to fulfill the content delivery request comprises using a round robin selection of a communications network between a user that made the content delivery request and the selected suitable content delivery network.

17. The method of claim 11, wherein selecting the suitable content delivery network to fulfill the content delivery request comprises using a peer relationship between a communications network and a user that made the content delivery request and the selected suitable content delivery network.

18. The method of claim 11, further comprising balancing usage between a plurality of network selectors.

19. The method of claim 18, wherein balancing usage between a plurality of network selectors comprises balancing usage in a regional area.

20. The method of claim 19, wherein balancing usage between a plurality of network selectors further comprises balancing usage in a global area.

21. The method of claim 11 wherein:
the content delivery request further comprises authentication information that is used by the network selector to verify that the set top box is authorized to receive the requested data content; and
the selecting is further based on the authentication information.

* * * * *